United States Patent [19]
Friend et al.

[11] Patent Number: 5,969,475
[45] Date of Patent: Oct. 19, 1999

[54] TUNEABLE MICROCAVITIES

[75] Inventors: Richard Henry Friend, Cambridge; Helmut Becker, Scherefeld, both of United Kingdom

[73] Assignee: Cambridge Display Technology Ltd., Cambridge, United Kingdom

[21] Appl. No.: 08/984,636

[22] Filed: Dec. 3, 1997

[30] Foreign Application Priority Data

Dec. 4, 1996 [GB] United Kingdom ............... 9625236
Jun. 16, 1997 [GB] United Kingdom ............... 9712515

[51] Int. Cl.$^6$ ........................................... H01J 1/70
[52] U.S. Cl. .............................. 313/506; 313/498
[58] Field of Search ................. 313/498, 499, 313/500, 501, 503, 504, 506, 508, 509

[56] References Cited

U.S. PATENT DOCUMENTS

| 4,995,043 | 2/1991 | Kuwata et al. ............................ 372/7 |
| 5,559,400 | 9/1996 | Nakayama et al. . |
| 5,616,986 | 4/1997 | Jacobsen et al. ........................ 313/461 |
| 5,891,554 | 4/1999 | Hosokawa et al. ..................... 428/212 |

FOREIGN PATENT DOCUMENTS 0 686 662 A2  12/1995  European Pat. Off. .

OTHER PUBLICATIONS

Dodabalapur, A. et al., "Electroluminescence from Organic Semiconductors in Patterned Microcavities", *Electronics Letters*, 30(12): 1000–1002 (Jun. 9, 1994).

Era, M. et al., "Polarized Electroluminescence from Oriented P–Sexiphenyl Vacuum–Deposited Film", *Appl. Phys. Lett.*, 67(17): 2463–2438 (Oct. 23, 1995).

Gruner, J. et al., "Emission Enhancement in Single–Layer Conjugated Polymer Microcavities", *J. Appl. Phys.*, 80(1): 207–215 (Jul. 1, 1996).

Lemmer, U. et al., "Microcavity Effects in a Spin–Coated Polymer Two–Layer System", *Appl. Phys. Lett.*, 66(11): 1301–1303 (Mar. 13, 1995).

Mauch, R. et al., "Inorganic and Organic Electroluminescence", *Wissenschaft & Technik Verlag*, 211–214 (Aug. 12–15, 1996).

Misawa, K. et al., "New Fabrication Method for Highly Oriented J Aggregates Dispersed in Polymer Films", *Appl. Phys. Lett.* 63(5): 577–579 (Aug. 2, 1993).

Shi, J. et al., "Doped Organic Electroluminescent Devices with Improved Stability", *Appl. Phys. Lett.*, 70(13): 1665–1667 (Mar. 31, 1997).

*Primary Examiner*—Vip Patel
*Assistant Examiner*—Matthew Gerike
*Attorney, Agent, or Firm*—Merchant & Gould P.C.

[57] ABSTRACT

A light-emitting cavity device comprising: a pair of mirrors spaced apart to define a resonant cavity; a luminescent layer located in the cavity; and a control layer located in the cavity and controllable to adjust the resonance wavelength of the cavity and thereby spectrally redistribute the energy emitted by the luminescent layer.

23 Claims, 4 Drawing Sheets

TUNEABLE MICROCAVITIES

BACKGROUND OF THE INVENTION

This invention relates to tuneable microcavities, and especially their use in luminescent devices.

FIG. 1 shows a planar microcavity. This is a Fabry-Perot resonator with two mirrors 1,2 spaced apart by a cavity 3 which contains a photon-emitting material 4. The mirror separation is of the order of the optical wavelength, so that the resonant frequency of the cavity corresponds to an optical frequency. Such a structure therefore has a narrow emission spectrum, allowing emission only at the resonance wavelength(s) of the cavity. It is also capable of enhancing the emission at a certain wavelength compared to the free-space emission of the luminescent material (see J. Grüner et al. J Appl. Phys. 80, 207 (1996)). These properties have proved to be useful for light-emitting devices based on broad bandwidth emitters such as organic molecular or polymeric materials, providing the improved colour purity and spectral tuneability required for multi-colour display applications (see U. Lemmer et al. Appl. Phys. Lett. 66, 1301 (1996); H. F. Wittmann et al. Adv. Mater. 6, 541 (1995); and A. Dodabalapur et al. Electronics Letters 30, 1000 (1994)).

One type of electroluminescent device is described in PCT/WO90/13148, the contents of which are incorporated herein by reference. The basic structure of this device is a light-emitting polymer film (for instance a film of a poly(p-phenylenevinylene)—"PPV") sandwiched between two electrodes, one of which injects electrons and the other of which injects holes. It is believed that the electrons and holes excite the polymer film, emitting photons. These devices have potential as flat panel displays.

In more detail, such an organic electroluminescent device ("OLED") typically comprises an anode for injecting the positive charge carriers, a cathode for injecting the negative charge carriers and, sandwiched between the electrodes, at least one organoluminescent layer. The anode is typically a layer of indium-tin oxide ("ITO") which is deposited on a glass substrate. The organic layer(s) are then deposited on the anode and the cathode is then deposited on the organic layer(s) by, for example, evaporating or sputtering. The device is then packaged for protection.

Organic light emitting devices have been incorporated in microcavity structures (see the papers by Lemmer et al. and Wittmann et al.). It has been shown that by using different thicknesses of a patterned inert filler it is possible to fabricate microcavity light-emitting devices with emission peaks from 490 nm to 630 nm from a single organic semiconductor (see the paper by Dodabalapur et al.). However, in such devices the resonance wavelength, and hence the emission colour, is fixed when the device is fabricated. Therefore, the colour (for instance of an individual pixel in a multi-pixel display) cannot be varied independently and/or externally after fabrication.

SUMMARY OF THE INVENTION

According to the present invention there is provided a light-emitting cavity device comprising: a pair of mirrors spaced apart to define a resonant cavity; a luminescent layer located in the cavity; and a control layer located in the cavity and controllable to adjust the resonance wavelength of the cavity and thereby spectrally redistribute the energy emitted by the luminescent layer.

The mirrors preferably have a reflectivity high enough to support a resonant cavity mode in the spectral range where the luminescent material emits. This is most preferably in the visible light range. One or both mirrors are preferably non-absorbing or substantially non-absorbing mirrors, for example distributed Bragg reflectors ("DBR"). One or both of the mirrors may be conductive so as to serve as an electrode of the device.

The resonance wavelength of the cavity is preferably adjusted by a change in refractive index or thickness of the cavity and/or of the control layer. Preferably the refractive index of the control layer is controllable to adjust the resonance wavelength of the cavity. The control layer preferably comprises a material whose refractive index is adjustable by the application of a stimulus. The stimulus may be an electric field, electromagnetic radiation (e.g. UV or IR radiation), pressure, or a chemical (especially a gas). One or both mirrors of the cavity may suitably be transparent to the relevant stimulus. The control layer most preferably comprises a liquid crystalline material, for instance a liquid crystal or a liquid crystalline polymer. The device may also comprise an alignment layer adjacent the liquid crystal for aligning (for example by means of its surface relief) the molecules of the liquid crystal.

The control layer may be controlled by the application of an electric field across it. In this case the device preferably comprises a pair of electrodes disposed on either side of the control layer. One or both of these electrodes preferably lies outside the cavity. Where one or both of the mirrors are conductive they may also constitute one or both of those electrodes. If either of the electrodes lies in the cavity (between the mirrors) it is preferably transparent (or at least partially transparent), at least in the range of frequencies emitted by the luminescent layer.

All material in the cavity preferably has low absorption in the range of emission of the luminescent material.

The luminescent material could be a photo- or electroluminescent material. The luminescent material could comprise an inorganic semiconductor (e.g. ZnS, ZnSe or GaN), a glass doped with a fluorescent material or an organic material. The luminescent material could be a luminescent organic polymer (an organoluminescent polymer), especially a conductive or semi-conductive polymer such as a semiconductive conjugated polymer material. The luminescent material could be tris (8-hydroxyquinoline)aluminum, PPV, poly(2-methoxy-5(2'-ethyl)hexyloxyphenyleneviylene) ("MEH—PPV"), a PPV-derivative (e.g. a di-alkoxy derivative), a polyfluorene and/or a co-polymer incorporating polyfluorene segments, PPVs and/or related co-polymers.

The term "conjugated" indicates a polymer for which the main chain is either fully conjugated, having extended pi molecular orbitals along the length of the chain, or is substantially conjugated, but with interruptions to conjugation at various positions, either random or regular, along the main chain. It includes within its scope homopolymers and copolymers.

Where the luminescent material is an electroluminescent material there are preferably electrodes located on either side of it for applying an electric field to stimulate the luminescent material to emit light. One of these electrodes may lie outside the cavity or be provided by one of the mirrors. One of the electrodes may lie within the cavity (most preferably between the luminescent layer and the control layer) in which case it is preferably transparent or semi-transparent, at least in the range of frequencies emitted by the luminescent layer. One of these electrodes may be the same as one of the electrodes for applying an electric field across the control layer.

The control layer is preferably substantially thicker than the luminescent layer. Preferably the ratio of the thickness of the control layer to the thickness of the luminescent layer is in the range from 50 to 300 nm, preferably in the range from 70 to 150 nm.

The light emitted from the cavity is preferably fully, substantially fully or at least partially linearly polarised. To this end, the device may comprise a polariser for (to a suitable extent) polarising light emitted from the cavity. The polariser may suitably be in the form of a sheet, suitably located between the cavity and a viewer. Another suitable solution is for the luminescent layer to be adapted to emit at least partially polarised light.

BRIEF DESCRIPTION OF THE DRAWINGS

The present invention will now be described by way of example with reference to the accompanying drawings, in which.

DETAILED DESCRIPTION OF THE PREFERRED EMBODIMENTS

Figure 1:
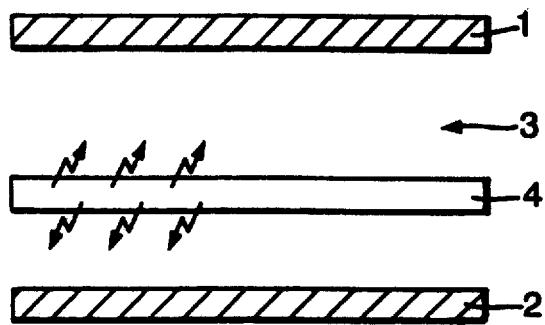
FIG. 1 shows a planar microcavity.
Figure 2:
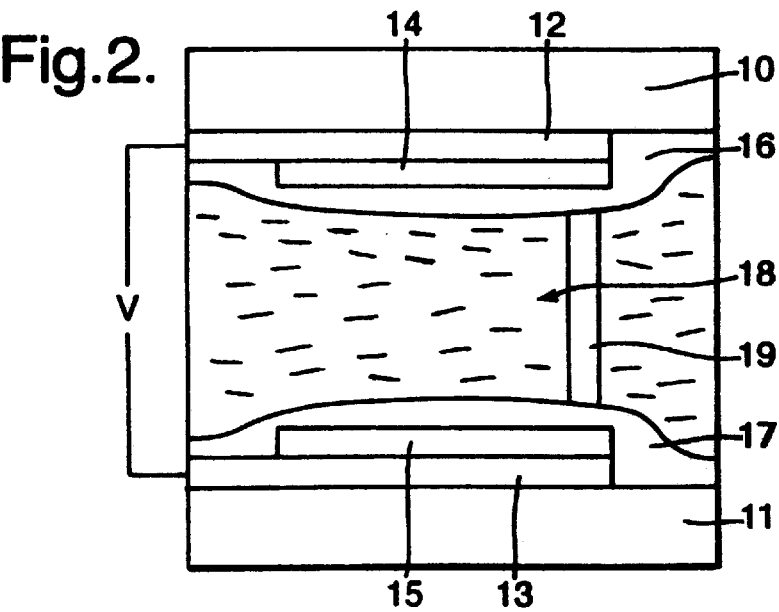
FIG. 2 shows an example of a microcavity device.

FIG. 2 shows an embodiment of a microcavity device. The device comprises a pair of glass sheets 10,11 each of which bears a number of layers. Each glass sheet bears an electrode layer 12,13 which extends to the edge of the glass sheet to allow it to be connected to an external voltage. Over each electrode layer is a mirror layer 14,15. Over the mirror layer of one glass sheet is a layer 16 of rubbed polyimide. Over the mirror layer of the other glass substrate is a layer 17 of PPV. The glass sheets are arranged so that the polyimide layer faces the PPV layer across a cavity 18, with a spacer 19 in the cavity holding the mirrors a fixed distance apart. The cavity is filled with liquid crystal material.

To fabricate the device each glass substrate is first provided with its electrode layer. The electrode layers are of transparent indium tin oxide (ITO) deposited by sputtering to a thickness of between 30 and 100 nm. The sheet resistance of the ITO electrodes is around 30 Ohms/square.

Then a mirror layer is deposited over each electrode layer. Each mirror layer is a 12 layer dielectric stack mirror (having alternating layers of MgF and ZnS) with a reflection band (higher than 97% reflectivity) from 490 to 650 nm and a peak reflectivity of about 99%.

PPV precursor is spun on to mirror 15 at 2000 rpm for 60 seconds and then baked at 200° C. for 12 hours under vacuum to form an 80 nm PPV layer 17 on the mirror 15.

On the other mirror 14 a layer of SN7212 polyimide is spun at 3000 rpm for 40 seconds and then baked at 220° C. for 3 hours. The polyimide layer 16 is then buffed at 500 rpm to provide an alignment surface for the liquid crystal.

The cell is assembled using UV glue. A spacing between the mirrors of around 2 $\mu$m is obtained by using 2 $\mu$m epostar spacers, only one of which is shown in FIG. 2. The cell is then vacuum filled with positive uniaxial BL048 nematic liquid crystal (available from Merck Ltd as Licrilite TM) and sealed. A voltage source V is connected across the electrodes.

The behaviour of the cell will now be discussed. The cell constitutes a planar microcavity. Three factors determine the effective length, $L_{eff}$, and thus the resonance wavelengths $\lambda_{Res}$ of the cavity: the separation of the mirrors, $L_{mirror\_separation}$, the phase change on reflection of light from the mirrors, $L_{phase\_change}$, and the refractive indices, n, of the materials inside the cavity:

$$L_{eff} = n \cdot L_{mirror\_separation} + L_{phase\_change}$$

and $$\lambda_{Res} = \frac{2L_{eff}}{q}$$

where q is an integer.

A nematic liquid crystal typically lies flat on the rubbed surface, with its mesogenic groups orientated by the rubbing, and re-orientates itself to stand perpendicular to the surface if an electric field is applied. The liquid crystal in the cell cavity has a high birefringence. BL048 has a low refractive index $n_o$ of 1.5277 perpendicular to its optic axis and a high refractive index $n_c$ of 1.7904 along the optic axis. Consequently the two normal modes of polarisation in the liquid crystal will sample the same refractive index $n_o$ if the light propagates along the optic axis but two different refractive indices $n_o$ and $n(\theta)$ if the light propagates in any other direction, with $n(\theta)$ depending on the angle between the optic axis and the direction of light propagation and $n_o < n(\theta) < n_c$. By applying an electric field across the electrodes the orientation of the liquid crystal molecules within the cell can be controlled, and this allows the refractive index within the cavity to be controlled. Thus the effective length of the cavity can be altered without changing its actual length. However, as explained above, only one polarisation samples a changed refractive index.

The operation of the cell will now be described. To excite the photoluminescence ("PL") of the PPV a 458 nm laser is used. PPV can show efficient luminescence (with a PL efficiency of up to 80%) and has a broad emission spectrum which spans three cavity modes for the device of FIG. 2. The lower panel of FIG. 3 shows at 20 the free-space emission spectrum of PPV; its structure is due to vibronic coupling to the excitonic emission process.

Figure 3:
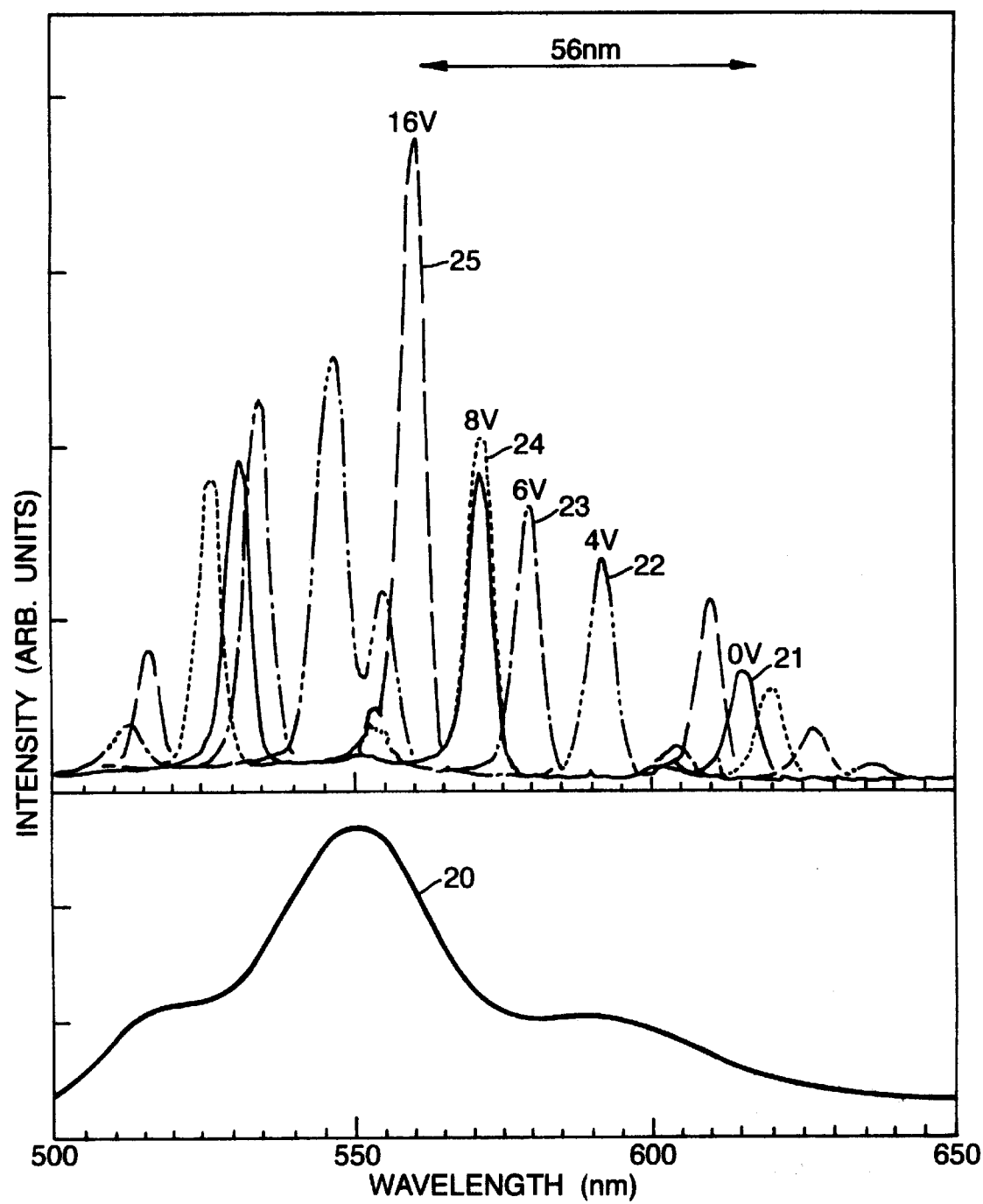
FIG. 3 shows the free-space emission spectrum of PPV and illustrates the forward emission spectrum from the device of FIG. 2.

The upper panel of FIG. 3 shows the effect of applying electric fields across the electrodes of the cell whilst the PPV is being pumped by the laser. The spectra of FIG. 3 are measured with a polariser placed in front of the device, so as to pass light linearly polarised along the rubbing direction of the polyimide. (The polariser could polarise the pumping light or the emitted light). The electric fields are applied as a square wave of frequency 1 kHz and amplitude in the range from 0V to 16V. Lines 21 to 25, corresponding respectively to fields of 0V, 4V, 6V, 8V and 16V are shown in the upper panel of FIG. 3. As shown in FIG. 3 the cavity modes are narrow (6 nm FWHM) and can be tuned in wavelength because the effective refractive index of the liquid crystal layer decreases as a function of bias, thus shifting the resonance wavelengths. For example, the twelfth mode is at 616 nm at 0V bias and can be moved to 560 nm at 16V bias. This shift of 56 nm corresponds to a change in refractive index from 1.73 to 1.55 (including the thickness of all layers in the cavity) or a change in the optical thickness of the cavity from 3.3 μm to 3.7 μm. At 4V bias a relatively high fraction of the modes corresponding to the ordinary refractive index $n_o$ appear in the spectrum. This is because at low fields and at intermediate angles the forces on the liquid crystal molecules due to the alignment layer and the electric field are not high enough to keep them oriented in the plane perpendicular to the mirrors and along the rubbing direction. The light transmitted by the polariser has therefore sampled both refractive indices $n_o$ and $n(\theta)$.

Figure 4:
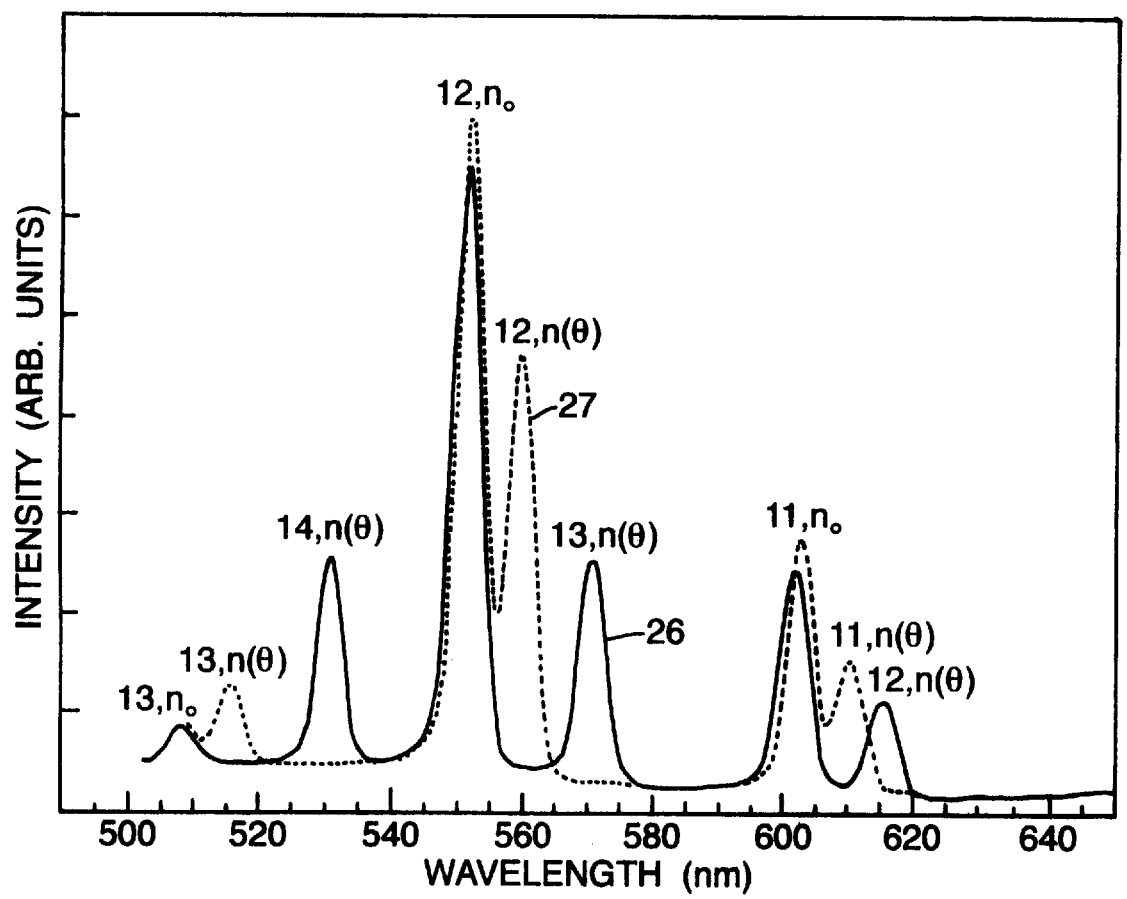
FIG. 4 illustrates the unpolarised emission spectrum from the device of FIG. 2.

FIG. 4 shows the PL measured without the polariser for fields of 0V and 16V (lines 26 and 27 respectively). With the polariser removed, modes with the electric field perpendicular to the rubbing direction are also observed. These modes correspond to the low refractive index $n_o$ of the liquid crystal and do not shift with applied field. The mode numbers (shown in FIG. 4) and the mirror separation (here 2.13 μm) can be calculated from the position and spacing of the peaks.

This shift of the twelfth mode by 56 nm corresponds to a shift of wavelength from green to blue light or red to green. Even greater changes are achievable with further optimisation of the thicknesses of the layers present in this device, as is detailed in the modelling below, up to 90 nm. In addition, still greater changes could be achieved by using liquid crystals with greater birefringence, and with improved alignment layer.

The available shift can be calculated in more detail. For a liquid crystal of optical anisotropy Δn, the shift in resonance wavelength Δλ (assuming the thickness of the emissive layer is small compared to the thickness of the liquid crystalline layer) is given by:

$$\Delta\lambda = \lambda_0 \cdot \frac{\Delta n}{n}$$

where $\lambda_0$ is the resonance wavelength of the microcavity before the refractive index is altered and n is the refractive index for which the resonance wavelength of the cavity is $\lambda_0$. Thus, even using BL048 liquid crystal a shift of around 90 nm is possible. For thicker cavities the mode spacing decreases. Then, increasing Δn optimises Δλ only to the point where the mode spacing becomes equal to Δλ. That is the case for:

$$d_{microcavity} = \frac{\lambda_0\left(\frac{n}{\Delta n}+1\right)}{2n}$$

This yields a mirror separation of 1.23 μm for BL048 and a wavelength separation of 90 nm in order to achieve a mode spacing of 90 nm.

Figure 5:
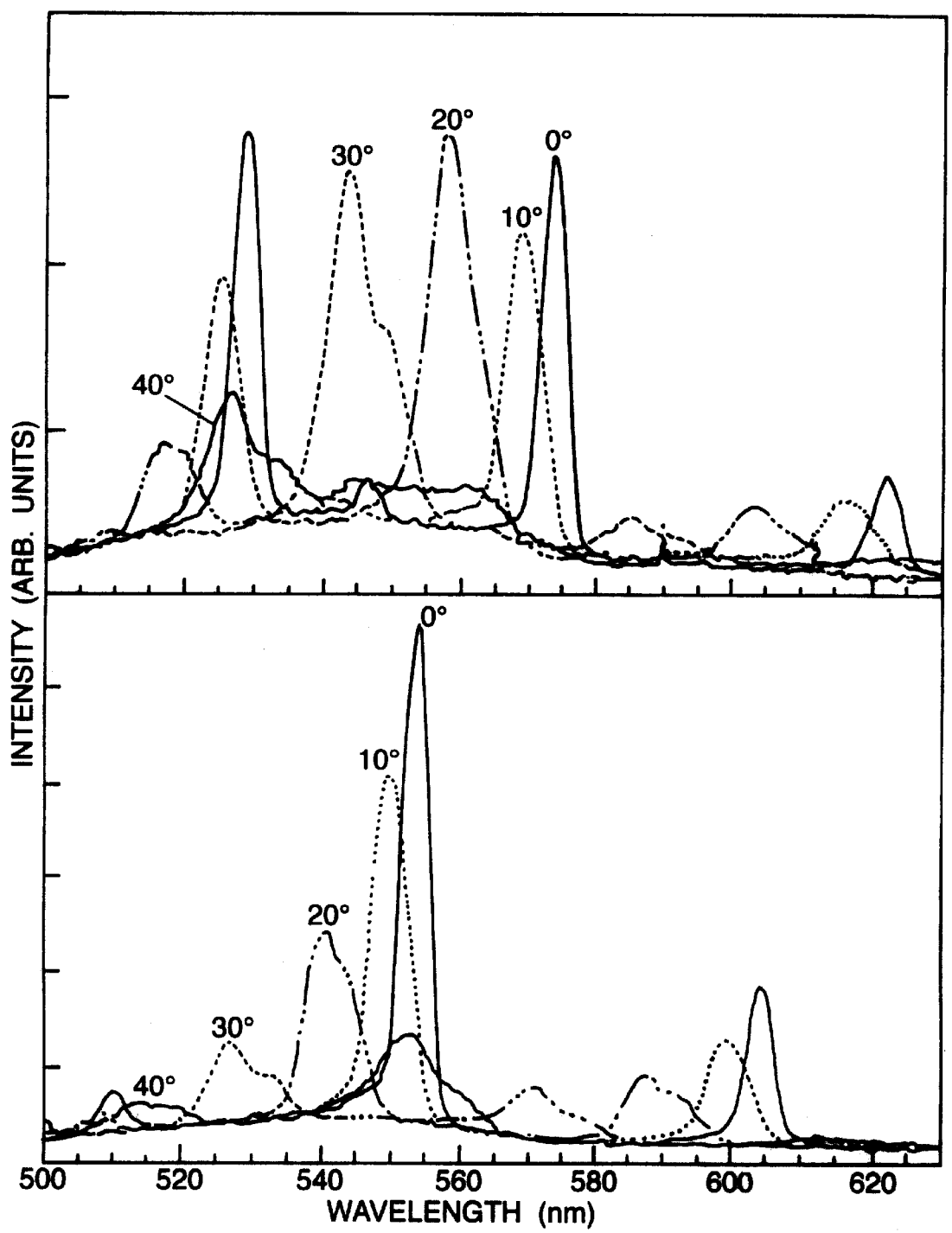
FIG. 5 illustrates the angular dependence of the emission spectrum from the device of FIG. 2.

Some characteristics of the device may be noted, especially as regards the coupling of cavity modes to the electronic excited states in the polymer. The cavity resonances may be tuned through the peaks in the emission spectrum of the polymer. FIG. 3 shows that the heights of the microcavity peaks approximately scale with the free-space PPV PL spectrum. However, at wavelengths between 550 nm and 575 nm the height of the microcavity peaks decreases slightly faster with increasing wavelength than might be expected from the free-space spectrum. Also, at 16V 10% more power is radiated into the forward direction than at 6V, although the total radiated power remains constant. This is believed to be due to the angular dependence of the microcavity emission. The wavelengths of the cavity modes decrease (blue shift) with increasing viewing angle, as can be seen from FIG. 5. FIG. 5 shows spectra at viewing angles of 0° to 40° for applied voltages of 6V (upper panel) and 16V (lower panel). If the modes at higher viewing angles overlap a peak in the PPV PL spectrum (as for the spectrum at 6V) they are coupled strongly (see FIG. 5) thus reducing the power radiated into the forward direction and also causing the more rapid drop-off between 550 nm and 575 nm.

Comparing the spectra of FIG. 3 for 0V and 8V it will be seen that both have cavity modes at 570 nm but since these have different mode numbers (differing by one) the adjacent modes are spaced more widely at 8V (95 nm as opposed to 85 nm). This leads to a reduction in intensity for the two outer peaks. As a result, the central peak at 8V is higher than that at 0V. This is believed to demonstrate the modification of the spontaneous transition rate in a microcavity leading to the channelling of radiative power into the resonant modes. This is in addition to the spatial redistribution of the radiative power.

The spontaneous emission rate of an optical emitter (such as PPV) can be altered if it is inside a resonant cavity because the cavity enhances the rate of emission at the resonance wavelengths of the cavity and suppresses the rate of emission at other wavelengths. In the presence of non-radiative decay channels as an increase in the total radiative rate can lead to an enhancement of the efficiency of light emission. The device of FIG. 2 affects the total emission rate only marginally. However, the spectral and spatial dependence of the radiative rate is strongly modified by the microcavity, which spectrally redistributes the energy emitted by the PPV layer. Thus, in contrast to the filter devices proposed in the prior art (see in particular U.S. Pat. No. 5,559,400 and T. Nakayama et al. Inorganic and Organic Electroluminescence 1996 Berlin p211), which select the emitted wavelength by rejecting unwanted frequencies from a luminescent layer, the device of FIG. 2 tunes wavelength emission by channelling radiative power (and therefore energy) into the resonant modes of the cavity. This provides a greatly increased efficiency. Providing the electrodes 12,13 outside the cavity also helps lift efficiency.

Some alternative methods of constructing the device of FIG. 2 will now be mentioned.

1. Electrode and mirror layers could be combined by providing a single conductive and reflective layer; for example a layer (say 20 to 50 nm thick) of a highly reflective metal—one example is a 35 nm thick layer of silver. Conductive mirror layers could also be distributed Bragg reflectors ("DBRs") with stopbands in the wavelength region where the luminescent polymer emits.

2. The luminescent material could be any suitable photo- or electroluminescent material. Numerous materials could be used instead of PPV. Examples include luminescent molecular materials such as those used in molecular electroluminescent diodes, examples of which are described in "Doped Organic Electroluminescent Devices with Improved Stability", J Shi and C W Tang, Appl. Phys. Lett. 70, 1665–1667 (1997). Other examples include luminescent materials selected from the class of conjugated polymers, of which the PPV described in the embodiment above is an example. Characteristics of conjugated polymers are described in our PCT/WO90/13148. The material should have a wide free-space emission spectrum because the output wavelength of the cavity can only be selected from within the range of the emission spectrum of the luminescent material.

3. Additional layers could be used, especially to protect the luminescent material. For example, where the luminescent material is PPV a layer of PEDT/PSS (see EP 0 686 662) could be used between it and one or more adjacent layers.

4. The mirror and electrode layers could be reversed so that at least one of the mirror layers is deposited directly on the glass sheet. However, this may be found disadvantageous because the electrode layer would then lie in the resonant cavity and may introduce additional losses.

5. Instead of a liquid crystal in the cavity a liquid crystal polymer ("LCP") (e.g. E63 or LCP105 available from Merck Liquid Crystals) could be used. This could allow the spacers to be dispensed with. The LCP could be prepared by a standard technique such as coating from solution. The thickness of the LCP film could be from 500 to 1000 nm. Higher voltages (e.g. 20V) generally need to be used with LCPs. Other alternatives are for the cavity to contain a material that exhibits a refractive index change on electrochemical doping, e.g. polythiophene (see P. G. Bruce "Solid State Electrochemistry", Cambridge University Press (1995)); exposure to radiation such as UV or IR, e.g. any suitable photorefractive material; or exposure to pressure or chemicals. In each case the device must be such as to allow the controlling medium to reach and act on the material in the cavity.

6. The luminescent material could be arranged so as to emit partially or fully polarised light and thus avoid the need for polarisers. To achieve this the material could be deposited so that its dipoles are selectively oriented. Suitable techniques for achieving polarised emission from luminescent materials include Langmuir-Blodgett deposition (see M. Era et al. Thin Solid Films 179, 1 (1989)), vertical spin coating (see K. Misawa et al. Appl. Phys. Lett. 63, 577 (1993)), rubbing-induced molecular orientation (see M. Hamaguchi Jpn. J. Appl. Phys. 34, 712 (1995), stretching of the polymer (see P. Dyreklev et al. Adv. Mater. 7, 43 (1995)) and vacuum deposition (M. Era et al. Appl. Phys. Lett. 67, 2436 (1995)). Another approach is to incorporate the polariser into the cavity.

7. Instead of the rubbed polyimide layer one of the other layers could be used to orientate the liquid crystal molecules. For instance the polyimide layer 16 could be omitted and the mirror 14 deposited by sputtering at an angle.

8. Instead of glass sheet substrates other materials could be used, for example a sheet of an organic material. The sheet could still provide structural stability to the device.

These are just non-limiting examples of the changes that could be made.

The device of FIG. 2 absorbs light at short wavelengths (e.g. blue and UV) and emits light in a part of the spectrum where the emission wavelength can be controlled. As an alternative to laser stimulation of the PPV, it could be excited by an LED (e.g. a blue nitride LED) or a UV fluorescent lamp providing a high peak excitation intensity. Another alternative is the embodiment shown in FIG. 6.

Figure 6:
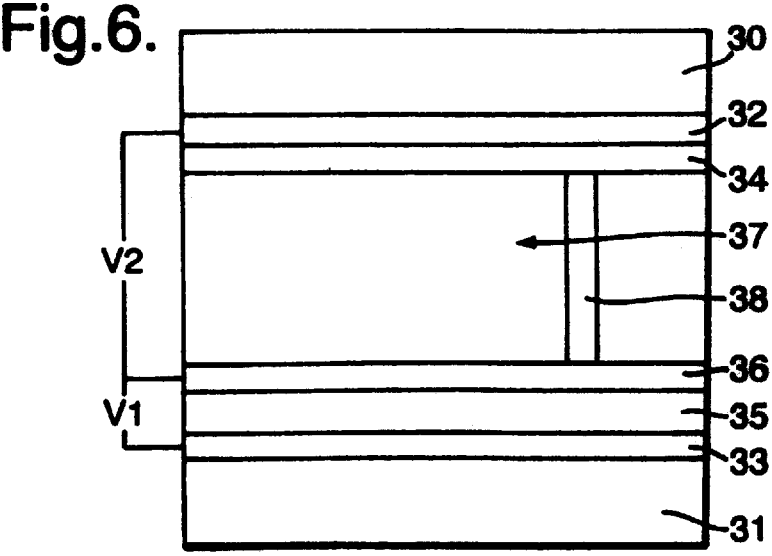
FIG. 6 shows another example of a microcavity device.

FIG. 6 shows an embodiment in which the PPV is stimulated electrically. (The electrical stimulation of PPV is described in PCT/WO90/13148). The device of FIG. 6 comprises a pair of glass sheets 30,31. Each glass sheet bears a mirror layer 32,33 which doubles as an electrode layer. Over the mirror/electrode layer 32 of one glass sheet is a layer 34 of rubbed polyimide. Over the mirror/electrode layer 33 of the other glass substrate is a layer 35 of PPV and over that a transparent electrode layer 36. The glass sheets are arranged so that the polyimide layer 34 faces the electrode layer 36 across a cavity 37, with a spacer 38 in the cavity holding the layers apart. The cavity is filled with liquid crystal material.

To fabricate the device each glass substrate is first provided with its mirror/electrode layer 32,33. In this example the mirrors are layers of silver 35 nm thick.

Over the mirror 32 the polyimide layer is deposited as for the device of FIG. 2.

Over the mirror 33 the PPV layer is deposited as for the device of FIG. 2. Over that layer the electrode layer 36 is deposited. This layer is of ITO, deposited by electrodeposition or sputtering to a thickness of 30 to 100 nm. The sheet resistance of the ITO layer is around 30 Ohms/square. Instead of ITO a transparent conductive polymer could be used for the electrode layer 36.

The cell is then assembled using UV glue. A spacing between the mirrors of around 2 $\mu$m is obtained by using 2 $\mu$m epostar spacers. The cell is then vacuum filled with BL048 liquid crystal and sealed.

In this embodiment two voltage sources are used, one (V1) for applying a voltage between electrodes 33 and 36 to stimulate the PPV and the other (V2) for applying a voltage between the electrodes 36 and 32 to control the liquid crystal.

This device has similar properties to that of FIG. 2. The PPV can be stimulated by applying a voltage at V1 and the colour of the emitted light tuned by V2 by adjusting the resonance wavelength of the microcavity as for the embodiment of FIG. 2. However, in this example no external laser stimulation is needed.

The principle of the devices described above may be used in several other applications:

1. By patterning the luminescent layers and/or the electrodes a multi-pixel display device may be fabricated. For example, in the embodiment of FIG. 6 the electrode layer 36 could be patterned to allow individual pixels and their associated cavity regions to be individually addressed. This overcomes the need in some prior devices for the luminescent layer to be patterned.

2. Sensing devices may be fabricated. In one example the luminescent layer could be a photovoltaic cell. Then, by selecting the resonance wavelength of the microcavity the absorption in the absorbing layers of the photovoltaic cell (and therefore the current or field generated by the cell) could be controlled. The response of the photovoltaic cell as a function of resonance wavelength could then provide information on the spectrum of light incident on the device.

3. An optical switch may be fabricated. The luminescent material could be chosen to have a narrow emission spectrum. When the resonance wavelength of the cavity lies in that spectrum the device will emit strongly—otherwise there will be low emission intensity (depending on the quality factor of the microcavity).

4. There could be fabricated a sensor for a parameter that causes the resonance wavelength of the cavity to change. A photodetector could be used to monitor the emission intensity and/or wavelength of the device. In a particularly compact solution the photodetector could be integrated within the device. For instance, instead of the layers 35 and 36 in FIG. 6 there could be an electrode of Al or Ca with an Al layer underneath it and on top a 100 nm PPV layer and an ITO top electrode. The Al layer would serve as the bottom mirror of the microcavity, and could be prepared as a DBR for maximum reflectivity. The overall device could then provide a sensor for electromagnetic radiation, humidity or pressure by detecting the change in emission wavelength, intensity, or current or voltage. An array of such devices could be used to detect spectral, spatial or time-dependent patterns of incident stimuli.

5. A modulator could be provided in the case when the resonance wavelength of the cavity is dependent on incident electromagnetic radiation.

6. In a multi-pixel display there is a need for uniformity of colour between the pixels. If a device has non-uniformity resulting from the production process this could be corrected by a tuneable microcavity with only a small change needed in refractive index.

7. If the tuning layer of the microcavity is selected so that it can be switched quickly from one effective length to another then display devices can be made in this way whose pixels switch colour quickly to provide a wide range of apparent colours by temporal multiplexing. For these devices the cell should preferably be relatively thin; around 1 to 2 μm.

The present invention may include any feature or combination of features disclosed herein either implicitly or explicitly or any generalisation thereof irrespective of whether it relates to the presently claimed invention. In view of the foregoing description it will be evident to a person skilled in the art that various modifications may be made within the scope of the invention.

We claim:

1. A light-emitting cavity device comprising:
   a pair of mirrors spaced apart to define a resonant cavity;
   a luminescent layer located in the cavity; and
   a control layer located in the cavity and controllable to adjust the resonance wavelength of the cavity and thereby spectrally redistribute the energy emitted by the luminescent layer.

2. A light-emitting cavity device as claimed in claim 1, wherein the refractive index of the control layer is controllable to adjust the resonance wavelength of the cavity.

3. A light-emitting cavity device as claimed in claim 2, wherein the refractive index of the control layer is controllable by the application of an electric field across the control layer.

4. A light-emitting cavity device as claimed in claim 3, comprising a pair of first electrodes located on opposite sides of the control layer for applying the electric field across the control layer.

5. A light-emitting cavity device as claimed in claim 4, wherein one of the first electrodes is located outside the cavity.

6. A light-emitting cavity device as claimed in claim 4, wherein both of the first electrodes are located outside the cavity.

7. A light-emitting cavity device as claimed in claim 4, wherein one of the first electrodes is provided by one of the mirrors.

8. A light-emitting cavity device as claimed in claim 1, wherein the control layer comprises a liquid crystalline material.

9. A light-emitting cavity device as claimed in claim 8, comprising an alignment layer located adjacent the control layer for promoting the alignment of the liquid crystalline material.

10. A light-emitting cavity device as claimed in claim 1, comprising a spacer for spacing the mirrors apart.

11. A light-emitting cavity device as claimed in claim 1, wherein the luminescent layer is an electroluminescent layer.

12. A light-emitting cavity device as claimed in claim 11, comprising a pair of second electrodes located on opposite sides of the electroluminescent layer for applying an electric field across the electroluminescent layer.

13. A light-emitting cavity device as claimed in claim 12, wherein at least one of the second electrodes is located outside the cavity.

14. A light-emitting cavity device as claimed in claim 12, wherein at least one of the second electrodes is located in the cavity.

15. A light-emitting cavity device as claimed in claim 14, wherein the or each second electrode located in the cavity is a transparent electrode.

16. A light-emitting cavity device as claimed in claim 12, wherein one of the first electrodes also serves as one of the second electrodes.

17. A light-emitting cavity device as claimed in claim 12, wherein one of the second electrodes is provided by one of the mirrors.

18. A light-emitting cavity device as claimed in claim 12, wherein at least one of the second electrodes is located outside the cavity.

19. A light-emitting cavity device as claimed in claim 1, wherein the refractive index of the control layer is controllable by the application of electromagnetic radiation to the control layer.

20. A light-emitting cavity device as claimed in claim 1, wherein the luminescent layer is a photoluminescent layer capable of emitting light in response to electromagnetic radiation.

21. A light-emitting cavity device as claimed in claim 19, wherein at least one of the mirrors is transparent to the said electromagnetic radiation.

22. A light-emitting cavity device as claimed in claim 1, comprising a polariser for linearly polarising light emitted from the cavity.

23. A light-emitting cavity device as claimed in claim 1, wherein the luminescent layer is adapted to emit at least partially linearly polarised light.

* * * * *